United States Patent [19]

Lubowitz et al.

[11] Patent Number: 5,175,234
[45] Date of Patent: Dec. 29, 1992

[54] LIGHTLY CROSSLINKED POLYIMIDES

[75] Inventors: Hyman R. Lubowitz, Rolling Hills Estates, Calif.; Clyde H. Sheppard, Bellevue, Wash.

[73] Assignee: The Boeing Company, Seattle, Wash.

[21] Appl. No.: 432,554

[22] Filed: Nov. 7, 1989

Related U.S. Application Data

[63] Continuation-in-part of Ser. No. 353,588, May 18, 1989, Pat. No. 5,116,935, which is a continuation-in-part of Ser. No. 46,376, May 4, 1987, abandoned, which is a continuation-in-part of Ser. No. 715,801, Mar. 22, 1985, abandoned, which is a continuation-in-part of Ser. No. 536,264, Sep. 27, 1983, abandoned.

[51] Int. Cl.$^5$ .................. C08G 73/10; C08G 69/26; C08G 8/02
[52] U.S. Cl. ............................ 528/173; 528/125; 528/126; 528/128; 528/170; 528/172; 528/174; 528/175; 528/185; 528/186; 528/188; 528/220; 528/226; 528/229; 528/322; 528/342; 528/345; 528/348; 528/350; 528/351; 528/352; 528/353; 525/422; 525/426
[58] Field of Search ............... 528/125, 126, 128, 170, 528/172, 185, 174, 175, 186, 188, 226, 229, 220, 322, 345, 353, 348, 342, 352, 350, 351; 525/422, 426

[56] References Cited

U.S. PATENT DOCUMENTS

| | | | |
|---|---|---|---|
| 3,528,950 | 9/1970 | Lubowitz | 528/125 |
| 3,565,549 | 2/1971 | Lubowitz et al. | 117/126 |
| 3,745,149 | 7/1973 | Serafini et al. | 528/125 |
| 3,998,786 | 12/1976 | D'Alelio | 528/353 |
| 4,055,543 | 10/1977 | D'Alelio | 528/353 |
| 4,075,171 | 2/1978 | D'Alelio | 528/125 |
| 4,142,870 | 3/1979 | Lovejoy | 51/298 |
| 4,244,853 | 1/1981 | Serafini et al. | 528/125 |
| 4,251,417 | 2/1981 | Chow et al. | 528/353 |
| 4,251,418 | 2/1981 | Chow et al. | 528/353 |
| 4,251,420 | 2/1981 | Antonopolos et al. | 528/353 |
| 4,271,079 | 6/1981 | Maeda et al. | 528/353 |
| 4,299,946 | 11/1981 | Blame et al. | 528/128 |
| 4,376,710 | 3/1983 | Gardos et al. | 252/12.4 |
| 4,381,363 | 4/1983 | Reinhart, Jr. | 524/324 |
| 4,389,504 | 6/1983 | St. Clair et al. | 524/233 |
| 4,417,039 | 11/1983 | Reinhardt et al. | 526/285 |
| 4,417,044 | 11/1983 | Parekh | 528/179 |
| 4,418,181 | 11/1983 | Monacelli | 525/426 |
| 4,438,280 | 3/1984 | Monacelli | 526/457 |
| 4,579,957 | 4/1986 | Kanayama et al. | 548/421 |
| 4,604,437 | 8/1986 | Renner | 528/322 |
| 4,624,888 | 11/1986 | St. Clair et al. | 428/262 |
| 4,675,414 | 6/1987 | DeFusco et al. | 548/521 |
| 4,680,377 | 7/1987 | Matsumura et al. | 528/322 |
| 4,684,714 | 8/1987 | Lubowitz et al. | 528/353 |
| 4,772,722 | 9/1988 | Lukacs, III | 548/413 |

FOREIGN PATENT DOCUMENTS 0289798  11/1988  European Pat. Off. .
WO8404313 11/1984 World Int. Prop. O. .......... 528/125

OTHER PUBLICATIONS

St. Clair et al., "Additives Lower Pickup of Moisture by Polyimides", NASA Tech Briefs, Apr. 1989, p. 28.
R. Vannucci, "PMR Polyimide Compositions for Improved Performance at 371° C.", NASA N87-16071, 1987.

Primary Examiner—John Kight, III
Assistant Examiner—P. Hampton Hightower
Attorney, Agent, or Firm—Senniger, Powers, Leavitt & Roedel

[57] ABSTRACT

Polyimide oligomers include (1) linear, monofunctional crosslinking oligomers prepared by condensing a monoanhydride end cap with a diamine that includes alternating ether and "Sulfone" (—$SO_2$—, —S—, —CO—, —$(CF_3)_2C$—, or —$(CH_3)_2C$—) linkages connecting alternating aromatic radicals and with a dianhydride (or dianhydride mixture), particularly the unsaturated, aliphatic dianhydride commonly known as MCTC; (2) linear, mono- or difunctional crosslinking oligomers prepared by condensing an amine end cap with a diamine and a dianhydride; and (3) multidimensional, crosslinking oligomers having an aromatic hub and at least three radiating arms connected to the hub, each arm including a crosslinking end cap at its distal end and at least one imide linkage.

Blends, prepregs, and composites can be prepared from the oligomers.

Multidimensional oligomers can be prepared using ether-anhydride intermediates or etheramine intermediates formed by reacting a suitable hub with nitrophthalic anhydride or aminophenol.

29 Claims, No Drawings

LIGHTLY CROSSLINKED POLYIMIDES

REFERENCE TO RELATED APPLICATIONS

This application is a continuation-in-part application based upon U.S. Ser. No. 07/353,588, filed May 18, 1989 now U.S. Pat. No. 5,116,935, which was a continuation-in-part application based upon U.S. Ser. No. 07/046,376, filed May 4, 1987 now abandoned, which was a continuation-in-part application based upon U.S. Ser. No. 06/715,801, filed Mar. 22, 1985 now abandoned, which was a continuation-in-part application based on Ser. No. 06/536,264, filed Sep. 27, 1983, now abandoned.

TECHNICAL FIELD

The present invention relates to linear and multidimensional polyimide oligomers that include mono- or difunctional crosslinking end cap (terminal) groups. Cured composites of these oligomers display improved toughness, solvent-resistance, and thermal stability. The oligomers include backbones comprised of alternating residues of diamines and dianhydrides. The diamines generally include aryl radicals linked by alternating ether and "sulfone" linkages. The dianhydrides may include unsaturated aliphatic radicals. MCTC is a preferred dianhydride, if the oligomer is a linear, thermoplastic polyimide.

Blends are prepared from mixtures of the crosslinking oligomers and a compatible, noncrosslinking, comparable polymer, generally being a substantially equimolar mix.

BACKGROUND ART

Thermosetting resins that are commonly used in fiber-reinforced composites cannot be reshaped after thermoforming. Errors in forming cannot be corrected, so these thermosetting resins are undesirable in many applications.

Although thermoplastic resins are well known, the use of fiber-reinforced thermoplastic resins is a relatively new art. Fiber toughens and stiffens the thermoplastic resin to produce high-performance composite products. A sheet of fiber-reinforced resin can be heated and then stamped into a desired shape with appropriate dies. The shape can be altered thereafter, if desired.

Thermoplastic resins commonly have a tendency to be weakened by organic solvents. Accordingly, circuit boards formed from conventional, fiber-reinforced thermoplastic resin composites usually cannot be cleaned with solvents that are commonly used in the aerospace industry. In structural aircraft applications, care must also be taken to eliminate contact between the composites and hydraulic or cleaning fluids. At moderate or high temperatures, many fiber-reinforced thermoplastic composites lose their abilities to carry load due to softening of the resin. Thus, improved thermal stability and solvent-resistance are desirable to fulfill the existing needs for advanced composites. The oligomers of the present invention provide such polyimide composites when they are cured.

Recently, chemists have sought to synthesize oligomers for high performance advanced composites suitable for aerospace applications. These composites should exhibit solvent resistance, toughness, impact resistance, processibility, and strength, and should be thermoplastic. Oligomers and composites that have thermo-oxidative stability and, accordingly, can be used at elevated temperatures are particularly desirable.

While epoxy-based composites are suitable for many applications, their brittle nature and susceptibility to degradation make them inadequate for many aerospace applications, especially those applications which require thermally stable, tough composites. Accordingly, research has recently focused on polyimide composites to achieve an acceptable balance between thermal stability, solvent resistance, and toughness. Still the maximum temperatures for use of the polyimide composites, such as PMR-15, are about 600°–625° F., since they have glass transition temperatures of about 690° F.

There has been a progression of polyimide sulfone compounds synthesized to provide unique properties or combinations of properties. For example, Kwiatkowski and Brode synthesized maleic capped linear polyarylimides as disclosed in U.S. Pat. No. 3,839,287. Holub and Evans synthesized maleic or nadic capped imido-substituted polyester compositions as disclosed in U.S. Pat. No. 3,729,446. Monacelli proposed tetra-maleimides made through an amic acid mechanism with subsequent ring closure, as shown in U.S. Pat. Nos. 4,438,280 or 4,418,181. We synthesized thermally stable polysulfone oligomers as disclosed in U.S. Pat. No. 4,476,184 or U.S. Pat. No. 4,536,559, and have continued to make advances with polyetherimidesulfones, polybenzoxazolesulfones, polybutadienesulfones, and "star" or "starburst" multidimensional oligomers. We have shown surprisingly high glass transition temperatures yet reasonable processability and desirable physical properties in many of these oligomers and their composites.

Polybenzoxazoles, such as those disclosed in our copending applications U.S. Ser. No. 07/116,592 filed Nov. 3, 1987, now U.S. Pat. No. 4,965,336 (to Lubowitz & Sheppard) and Ser. No. 07/121,964 filed Nov. 7, 1987, now U.S. Pat. No. 4,868,270 (to Lubowitz, Sheppard, and Stephenson), may be used at temperatures up to about 750°–775° F., since these composites have glass transition temperatures of about 840° F. Some aerospace applications need composites which have even higher use temperatures while maintaining toughness, solvent resistance, processibility, formability, strength, and impact resistance.

Multidimensional oligomers, such as disclosed in our copending applications U.S. Ser. No. 07/000,605 filed Jan. 5, 1987, Ser. No. 07/167,656 filed Mar. 14, 1988 and Ser. No. 07/176,518 filed Apr. 1, 1988 have superior processibility over some advanced composite oligomers since they can be handled at lower temperatures. Upon curing, however, the phenylimide end caps crosslink so that the thermal resistance of the resulting composite is markedly increased with only a minor loss of stiffness, matrix stress transfer (impact resistance), toughness, elasticity, and other mechanical properties. Glass transition temperatures above 950° F. are achievable.

Commercial polyesters, when combined with well-known diluents, such as styrene, do not exhibit satisfactory thermal and oxidative resistance to be useful for aircraft or aerospace applications. Polyarylesters are often unsatisfactory, also, since the resins often are semicrystalline which may make them insoluble in laminating solvents, intractable in fusion, and subject to shrinking or warping during composite fabrication. Those polyarylesters that are soluble in conventional laminating solvents remain so in composite form, thereby limiting their usefulness in structural composites. The high concentration of ester groups contributes to resin strength and tenacity, but also makes the resin susceptible to the damaging effects of water absorption. High moisture absorption by commercial polyesters can lead to distortion of the composite when it is loaded at elevated temperature.

High performance, aerospace, polyester advanced composites, however, can be prepared using crosslinkable, end capped polyester imide ether sulfone oligomers that have an acceptable combination of solvent resistance, toughness, impact resistance, strength, processibility, formability, and thermal resistance. By including Schiff base (—CH=N—), imidazole, thiazole, or oxazole linkages in the oligomer chain, the linear, advanced composites formed with polyester oligomers of our copending application U.S. Ser. No. 07/137,493 filed Dec. 23, 1987 can have semiconductive or conductive properties when appropriately doped.

Conductive and semiconductive plastics have been extensively studied (see, e.g., U.S. Pat. Nos. 4,375,427; 4,338,222; 3,966,987; 4,344,869; and 4,344,870), but these polymers do not possess the blend of properties which are essential for aerospace applications. That is, the conductive polymers do not possess the blend of (1) toughness, (2) stiffness, (3) elasticity, (4) processibility, (5) impact resistance (and other matrix stress transfer capabilities), (6) retention of properties over a broad range of temperatures, and (7) high temperature resistance that is desirable on aerospace advanced composites. The prior art composites are often too brittle.

Thermally stable multidimensional oligomers having semiconductive or conductive properties when doped with suitable dopants are also known and are described in our copending applications, (including U.S. Ser. No. 06/773,381 Sep. 5, 1985, now abandoned and Ser. No. 07/212,404 filed Jun. 27, 1988 to Lubowitz, Sheppard and Torre). The linear arms of the oligomers contain conductive linkages, such as Schiff base (—N=CH—) linkages, between aromatic groups. Sulfone and ether linkages are interspersed in the arms. Each arm is terminated with a mono- or difunctional end cap to allow controlled crosslinking upon heat-induced or chemical-induced curing.

SUMMARY OF THE INVENTION

The present invention provides a series of thermoplastic resins or oligomers that produce composites resistant to attack by organic solvents. These preferred resins generally have linear backbones for improved thermal stability and are capped and crosslinked at the ends of the chains by thermal and/or chemical activation to provide improved solvent resistance. Imide linkages along the polymer backbone contribute to the inability of the resins to carry mechanical loads at moderately high temperatures. Sulfone (—SO$_2$—) or other electronegative linkages between aromatic groups provide improved toughness. The preferred resins resist chemical stress corrosion, can be thermoformed, and are chemically stable, especially against oxidation. Processible at temperatures as low as about 150°-200° F., the preferred oligomers generally include unsaturated aliphatic residues created by the condensation of aliphatic dianhydrides, like MCTC, with ethersulfone diamines of the general formula:

$$H_2N-Ar-O+Ar-L-Ar-O+_m Ar-NH_2$$

wherein
Ar = an aromatic radical;
L = an electronegative linkage selected from the group consisting of —SO$_2$—, —S—, —CO—, —(CF$_3$)$_2$C—, or —(CH$_3$)$_2$C—; and
m = a small integer greater than or equal to 1.

These crosslinkable, thermoplastic oligomers are formed by mixing together and reacting in a solvent under an inert atmosphere:
1) 2 moles of a monoanhydride end cap;
2) n+1 moles of the diamine; and,
3) n moles of the dianhydride;

wherein n is selected so that the oligomer has an average molecular weight between about 5,000 and 40,000, preferably between about 10,000 and 35,000, and more preferably between 20,000 and 30,000. In these ranges, the oligomer will have thermoplastic characteristics.

Similar oligomers can be prepared by the condensation of 2 moles of an amine end cap with n moles of the diamine and n+1 moles of the dianhydride.

Preferred monoanhydride end caps have the formula:

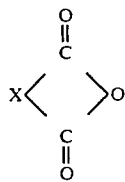

wherein X is selected from the group consisting of:

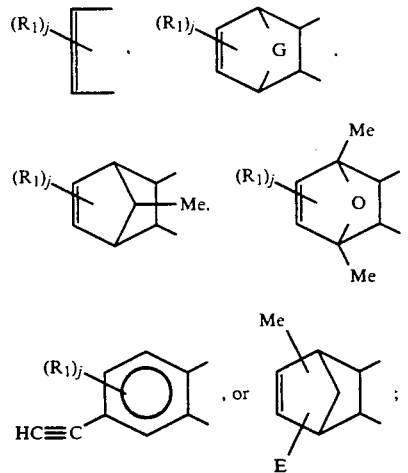

wherein
R$_1$ = any of lower alkyl, lower alkoxy, aryl, substituted alkyl, substituted aryl (including in either case hydroxyl or halo-substituents on replaceable hydrogens), aryloxy, or halogen;
j = 0, 1, or 2;
G = —CH$_2$—, —S—, —O—, or —SO$_2$—;
E = allyl or methallyl; and
Me = methyl (—CH$_3$).

These monoanhydride end caps yield monofunctional crosslinking end caps that have one crosslink at each end of the oligomer when the oligomers cure.

Preferred amine end caps have monofunctional or difunctional crosslinking potential, and have the general formula:

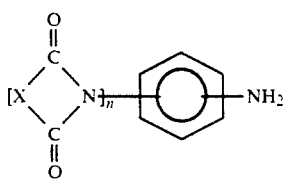

wherein X is as defined above, and n=1 or 2. These amine end caps are readily prepared by reacting the monoanhydrides with phenylene diamine or triaminobenzene.

Multidimensional polyimide oligomers include an aromatic hub (such as benzene) and three or more substantially identical radiating arms, each arm including one or more imide linkages and a mono- or difunctional crosslinking end cap. Multidimensional oligomers have surprisingly high use temperatures, often well above their curing temperatures, thereby providing superior advanced composites having comparable processing characteristics to conventional oligomers or resins.

The multidimensional oligomers can also be prepared through an etheranhydride intermediate hub of the general formula:

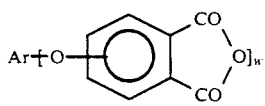

or an etheramine intermediate hub of the general formula:

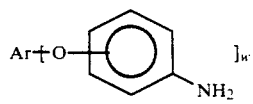

wherein
Ar = an aromatic radical, and
w = an integer greater than or equal to 3, and, preferably, 3 or 4.

Blends of multidimensional oligomers can also be prepared.

The etheranhydride intermediate can be prepared, for example, by reacting

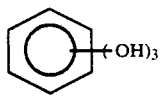

(i.e., phloroglucinol) with nitrophtalic anhydride. The etheramine intermediate can be prepared, for example, by reacting tribromobenzene with aminophenol. Those skilled in the art will recognize the general applicability of the processes to prepare analogous intermediates from corresponding hydroxy- and halo- substituted hubs.

Blends comprise mixtures of an oligomer and a compatible, noncrosslinking, comparable polymer. The blend will generally comprise substantially equimolar amounts of the oligomer and polymer. The polymer will generally have the same backbone structure and length as the oligomer, including the identical residues of diamines and dianhydrides. The polymers, however, are uncapped or preferably, are quenched with benzoic anhydride or aniline. Blends can be prepared by mixing miscible solutions of the oligomers and polymers.

Prepregs and composites are the most preferred products of the oligomers and blends, although varnishes, films, and coatings can also be prepared.

DESCRIPTION OF THE PREFERRED EMBODIMENTS

Monofunctional, crosslinkable, thermoplastic oligomers of the present invention are formed by reacting:
1) 2 moles of a monoanhydride end cap;
2) n+1 moles of a diamine having terminal amino groups; and,
3) n moles of a dianhydride;

wherein n is selected so that the oligomer has an average molecular weight between 5,000 and 40,000. The reaction usually occurs by mixing all three reactants in a suitable solvent in the presence of an inert atmosphere. Heating the mixture increases the reaction rate. Excess diamine and dianhydride may be provided, although substantially stoichiometric amounts are preferred.

The average molecular weight of the resulting oligomer should be between 5,000 and 40,000 to provide thermoplastic character to the oligomer, but is preferably between about 10,000 and 35,000, and still more preferably between 20,000 and 30,000. Mixtures of capped oligomers may also be used. For example, an oligomer having a molecular weight of 10,000 may be mixed with one having a molecular weight of 30,000, or an oligomer having a molecular weight of 5,000 may be mixed with one having a molecular weight of 35,000 or 40,000.

Within the preferred range, the oligomers can be crosslinked to form polymers that are relatively easy to process, are tough, have impact resistance, and possess superior thermomechanical properties. When oligomers having molecular weights less than about 5,000 are cured by crosslinking, the thermosetting character of the material is increased so that the ability of the material to be thermoformed is reduced or eliminated.

The monoanhydride preferably has the formula:

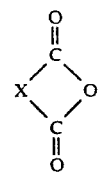

wherein X is selected from the group consisting of:

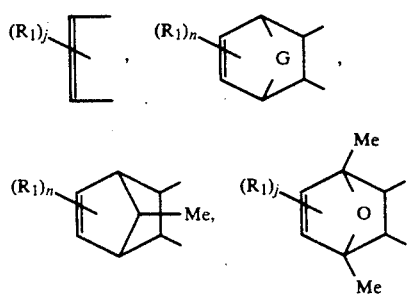

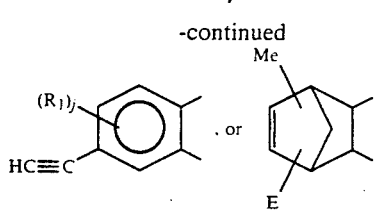

wherein
R₁=lower alkyl, lower alkoxy, aryl, substituted alkyl, substituted aryl (including in each case hydroxyl or halo-substituents on replaceable hydrogens), aryloxy, or halogen;
j=0, 1, or 2;
Me=methyl;
G=—SO₂—, —CH₂—, —S—, or —O—; and
E=methallyl or allyl.
Preferred diamines have the formula:

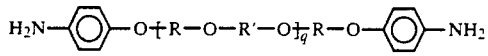

wherein R and R' are aromatic radicals, at least one of R and R' being a diaryl radical wherein the aryl rings are joined by a "sulfone" linkage, and q is an integer from 0 to 27 inclusive. Preferably R is selected from the group consisting of:

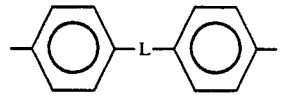

wherein L=—SO₂—, —(CF₃)₂C—, or —S—. R' is preferably selected from the group consisting of:

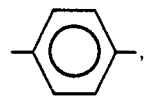

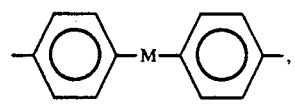

or

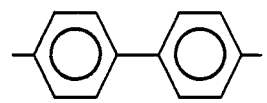

wherein M=—SO₂—, —S—, —O—, —(CH₃)₂C—, or —(CF₃)₂C—.

Each aryl group may include substituents for the replaceable hydrogens, the substituents being selected from the group consisting of halogen, alkyl groups having 1-4 carbon atoms, and alkoxy groups having 1-4 carbon atoms. Although the para-isomers are shown (and the resulting molecules are linear), meta-isomers may be used to form ribbon-like chains. The isomers (para- and meta-) may be mixed.

Preferred diamines are those in which R is

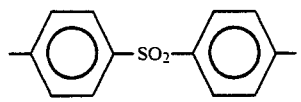

and R" is

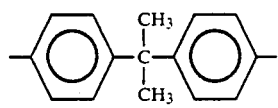

Accordingly, the diamines generally contain at least one phenoxyphenylsulfone group, such as:

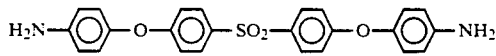

and

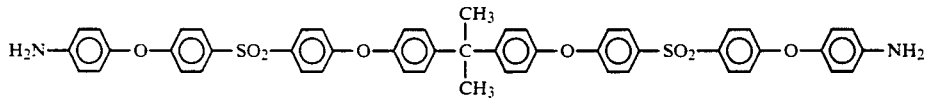

These diamines have alternating ether and "sulfone" linkages, wherein "sulfone" designates an electronegative linkage (—M—) as previously defined.

The molecular weights of the preferred aryl diamines described above vary from approximately 500–10,000. The amino groups and other substituents can be positioned either para or meta, as previously discussed. Lower molecular weight diamines are preferred.

In these monofunctional, thermoplastic, crosslinkable oligomers, the dianhydride preferably is 5-(2,5-diketotetrahydrofuryl)-3-methyl-3-cyclohexene-1,2-dicarboxylic anhydride (MCTC), an unsaturated, aliphatic dianhydride.

The diamines and dianhydrides react to form repeating imide linkages along the generally linear backbone of the oligomers. Preferred properties in the oligomer are obtained when the backbone is periodically disrupted by the inclusion of an aliphatic moiety, especially an MCTC residue.

Diamines which include phenoxyphenylsulfone moieties are preferred, since these diamines provide the blend of physical properties in the oligomers which are desired. Impact resistance and toughness is afforded with the "sulfone" linkages which act as joints or swivels between the aryl groups. The aliphatic residues, such as MCTC, provide lower melt temperatures, and allow the use of lower temperature end caps, such as oxynadic and dimethyl oxynadic (DONA) end caps.

The resulting oligomers cure at lower temperatures than other solvent-resistant oligomers, have the desirable features of polyimides, and have better solvent-resistance than conventional polyimides, such as those described in U.S. Pat. Nos. 3,998,786 or 3,897,395 (D'Alelio).

Oligomers of the present invention may be used to form prepregs by the conventional method of impregnating a suitable fabric with a mixture of the oligomer and a solvent. Suitable coreactants, such as p-phenylenediamine, benzidine, and 4,4'-methylenedianiline, may be added to the solvent when preparing prepregs, especially those having maleic end caps.

The prepregs may be cured by conventional vacuum bag techniques to crosslink the end caps. Temperatures suitable for curing are in the range of 150°–650° F. The resulting product is a cured, thermally stable, solvent-resistant composite. The crosslinked oligomer may also be used as an adhesive without curing. Such adhesives may be filled, if desired.

The combination of monoanhydride, diamine, and dianhydride for oligomers of the present invention can be selected to achieve an oligomer having a desired thermal stability (use temperature) within a relatively wide range. For example, oxynadic anhydride and dimethyl oxynadic anhydride have lower activation temperatures (generally around 400°–450° F.) and are best suited in oligomers which melt at or near this temperature range. Nadic anhydride or methyl nadic anhydride have intermediate activation temperatures (around 600°–650° F.) and are best suited for use in oligomers with melt (glass transition) temperatures near this range. Acetylenic phenyl anhydrides have higher activation temperatures (around 650°–700° F.) and are, accordingly, preferred for use with the higher melting oligomers. It is important that the oligomer flow near the curing (activation) temperature of the end caps. Use of an unsaturated, aliphatic dianhydride, such as MCTC, with electronegative "sulfone" linkages reduces the melt temperatures sufficiently to allow use of oxynadic anhydride and dimethyl oxynadic anhydride end caps in otherwise aryl sulfone backbone oligomers.

Nadic anhydride end caps can be used with BTDA (benzophenonetetracarboxylic dianhydride). Acetylenic phenyl anhydride end caps can be used with MCTC.

For the thermoplastic regime with melt temperatures of about 200° F. or less, it is important to use an unsaturated, aliphatic dianhydride like MCTC to provide the lowered melt temperature of the oligomer. Although the "sulfone" linkages draw electrons from the stable aromatic rings (and thereby reduce their thermal stability), the lower bond energies associated with aliphatic radicals are important for achieving the desired properties in the monofunctional, crosslinkable, thermoplastic oligomers (prepregs, and composites) of the present invention. The unsaturated carbon-carbon bond of the aliphatic dianhydride residue provides a flat segment of the polyimide between its adjacent imide linkages while the diamine residues include "sulfone" swivels rather than fixed orientations.

Similar oligomers to those just described can be prepared by condensation of amines, diamines, dianhydrides. Difunctional, crosslinkable oligomers can be prepared in this synthesis, thereby improving the solvent-resistance and thermal stability. Such oligomers are synthesized by condensing:

2 moles of an amine end cap;
n moles of a diamine; and
n+1 moles of a dianhydride, wherein n is selected so that the oligomers exhibit thermoplastic properties, as previously explained.

The amine end caps have the general formula:

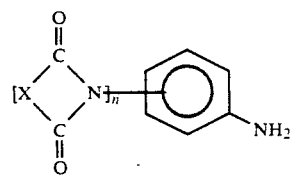

wherein X is as previously defined for the monoanhydrides and n=1 or 2. These amine end caps can be prepared by reacting the monoanhydrides with phenylene diamine or triaminobenzene.

The difunctional crosslinkable oligomers are a new class of polyimides that are believed to exhibit better thermomechanical properties than other capped or uncapped polyimides. When cured, the difunctional caps double the number of crosslinks that form, thereby stabilizing the composites and increasing the solvent resistance.

The difunctional crosslinking polyimides constitute a broader class of oligomers than the corresponding class of monofunctional polyimides. That is, the diamines and dianhydrides for this difunctional class can be drawn from a broader list, and can include, typically, any aromatic or aliphatic diamine or dianhydride. Lower molecular weight aromatic diamines and dianhydrides are preferred.

To this end, the diamine may be selected from the group consisting of:

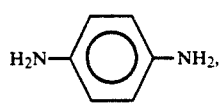

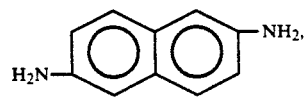

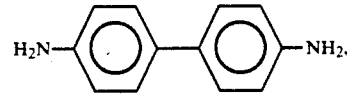

-continued
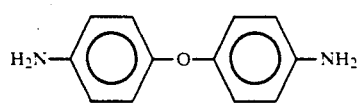
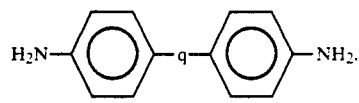
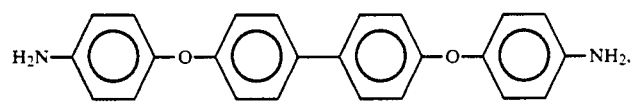
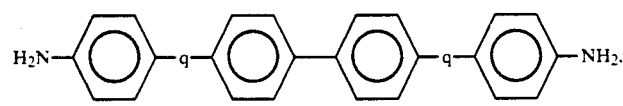
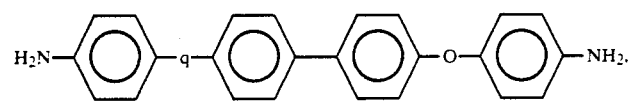
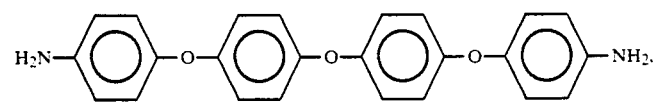
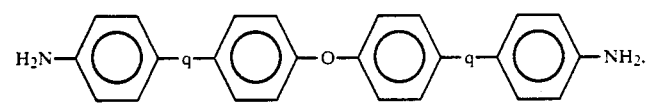
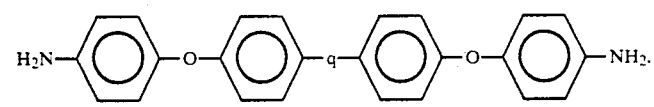
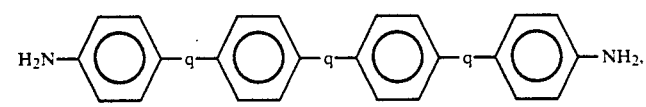
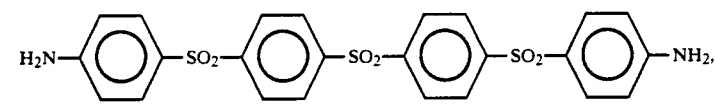
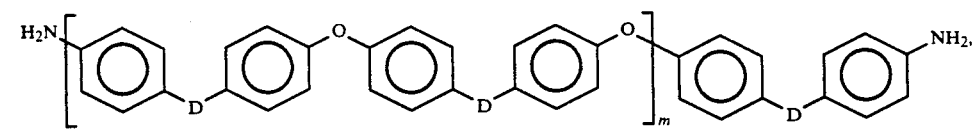
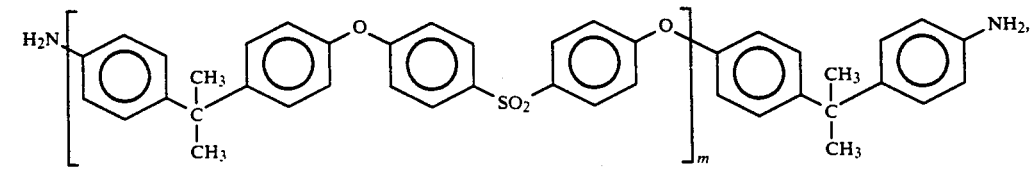
or -continued

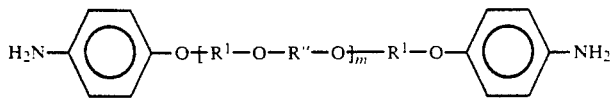

wherein $R^1$ = 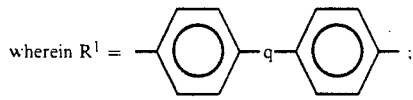 ;

$R''$ = 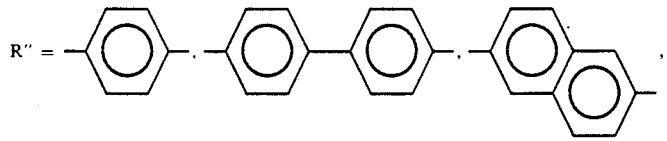 ,

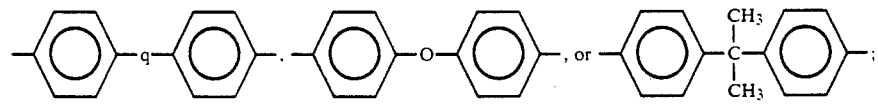 ;

q= —SO$_2$—, —CO—, —S—, —(CF$_3$)$_2$C—, —O—, or —(CH$_3$)$_2$C— and preferably —SO$_2$— or —CO—;

Me=methyl;

m=an integer, generally less than 5, and preferably 0 or 1; and

D=any of —CO—, —SO$_2$—, or —(CF$_3$)$_2$C—.

Other diamines that may be used, but that are not preferred, include those described in U.S. Pat. Nos. 4,504,632; 4,058,505; 4,576,857; 4,251,417; and 4,251,418. The aryl or polyaryl ether "sulfone" diamines previously described are preferred, since these diamines provide high thermal stability to the resulting oligomers and composites. Mixtures of diamines might be used.

When the diamine has the formula:

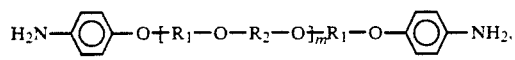

$R_1$ is generally selected from the group consisting of:

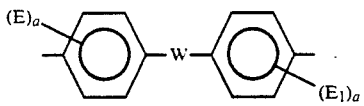

wherein W= —SO$_2$—, —S—, or —(CF$_3$)$_2$C—; and $R_2$ is selected from the group consisting of:

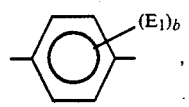 ,

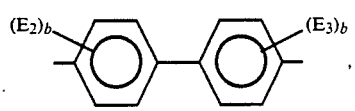 ,

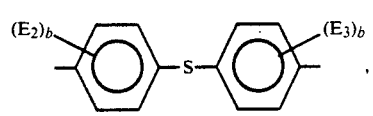 ,

-continued

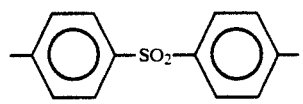

or mixtures thereof, wherein E, $E_1$, $E_2$, and $E_3$ each represent substituents selected from the group consisting of halogen, alkyl groups having 1 to 4 carbon atoms, and alkoxy groups having 1 to 4 carbon atoms, and "a" and "b" are each an integer having a value of 0 to 4.

Particularly preferred compounds are those in which $R_1$ is

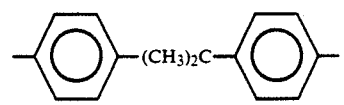

and $R_2$ is

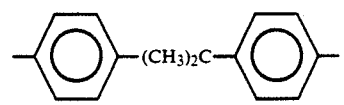

so that the phenoxyphenyl sulfone diamines include:

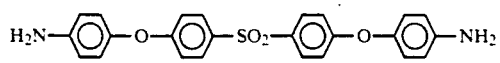

and

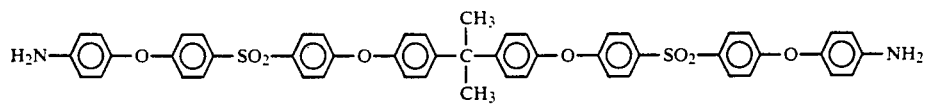

The molecular weight of these diamines can be varied from approximately 500 to about 2000. Using lower molecular weight diamines enhances the mechanical properties of the difunctional polyimide oligomers, each of which preferably has alternating ether "sulfone" segments in the backbones as indicated above.

Phenoxyphenyl sulfone diamines of this general nature can be prepared by reacting two moles of aminophenol with (n+1) moles of an aryl radical having terminal, reactive halide functional groups (dihalogens), such as 4,4'-dichlorodiphenyl sulfone, and n moles of a suitable bisphenol (dihydroxy aryl compounds). The bisphenol is preferably selected from the group consisting of:
2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ehthane;
2,2-bis-(3-phenyl-4-hydroxyphenyl)-propane;
2,2-bis-(4-hydroxynaphthyl)-propane
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane;
or mixtures thereof, as disclosed in U.S. Pat. No. 3,262,914. Bisphenols having aromatic character (i.e., absence of aliphatic segments), such as bisphenol A, are preferred.

The dihalogens in this circumstance preferably are selected from the group consisting of:

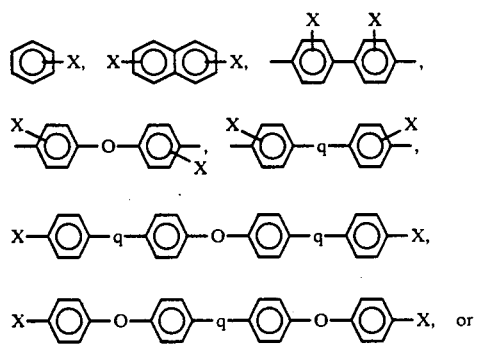

-continued

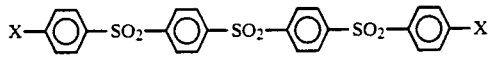

wherein
X=halogen, preferably chlorine; and
q=—S—, —SO$_2$—, —CO—, —(CH$_3$)$_2$C—, —O— and —(CF$_3$)$_2$C—, and preferably either —SO$_2$— or —CO—.

The condensation reaction creates diamine ethers that ordinarily include intermediate "sulfone" linkages. The condensation generally occurs through a phenate mechanism in the presence of K$_2$CO$_3$ or another base in DMSO/toluene solvent.

While para isomerization is shown, other isomers are possible. Furthermore, the aryl groups can have substituents, if desired, such as halogen, lower alkyl up to about 4 carbon atoms, lower alkoxy up to about 4 carbon atoms, or aryl. Substituents may create steric hindrance problems in synthesizing the oligomers or in crosslinking the oligomers into the final composites.

The grain size of the K$_2$CO$_3$(s) should fall within the 100-250 ANSI mesh range.

The dianhydride used in the polyimide synthesis preferably is selected from the group consisting of:
 (a) pyromellitic dianhydride,
 (b) benzophenonetetracarboxylic dianhydride (BTDA),
 (c) 5-(2,5-diketotetrahydrofuryl)-3-methylcyclohexene-1,2-dicarboxylic anhydride (MCTC), and
 (d) para - and meta - dianhydrides of the general formula:

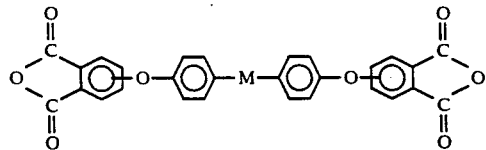

Wherein
M=—SO$_2$—, —S—, —CO—, —O—, —(CH$_3$)$_2$C— or —(CF$_3$)$_2$C—;
but may be any aromatic or aliphatic dianhydride, such as those disclosed in U.S. Pat. Nos. 4,504,632; 4,577,034; 4,197,397; 4,251,417; 4,251,418; or 4,251,420. Mixtures of dianhydrides might be used. Lower molecular weight dianhydrides are preferred, and MCTC or other aliphatic dianhydrides are the most preferred for the lower curing difunctional polyimides, as previously described.

Blended oligomers suitable for composites can be made by blending a substantially equimolar amount of a comparable polymer that is incapable of crosslinking with the crosslinkable oligomers. These blends merge the desired properties of crosslinking oligomers and noncrosslinking polymers to provide tough, yet processible, resin blends. The comparable polymer is usually synthesized by condensing the same diamine of the crosslinking oligomer with the same dianhydride of the crosslinking oligomer and quenching the polymerization with a suitable terminating group. In this way, the comparable oligomer has the identical backbone to that of the crosslinkable oligomer but does not have the crosslinkable end caps. Generally the terminating group will be a simple anhydride, such as benzoic anhydride, added to the diamine and dianhydride to quench the polymerization and to achieve an average formula weight for the comparable oligomer substantially equal to that of the crosslinkable oligomer. The oligomer may have mono- or difunctional crosslinking end caps.

Impact resistance of the cured composites formed from prepregs of the oligomers can be increased without deleterious loss of solvent resistance by forming the prepregs with a blend of capped oligomers to provide crosslinking upon curing and uncapped polymers. A 50-50 molar blend of oligomer and polymer is preferably formed by dissolving the capped oligomer in a suitable first solvent, dissolving the uncapped polymer in a separate portion of the same solvent or in a solvent miscible with the first solvent, mixing the two solvent solutions to form a lacquer, and applying the lacquer to fabric in a conventional prepregging process.

Although the polymer in the blend usually has the same length backbone as the oligomer, the properties of the composite formed from the blend can be adjusted by altering the ratio of formula weights for the polymer and oligomer. The terminal groups of the polymer are unimportant so long as these groups do not react with or impede the crosslinking of the oligomer end caps. Also, it is probably nonessential that the oligomer and polymer have identical repeating units, but that the oligomer and polymer merely be compatible in the mixed solution or lacquer prior to sweeping out the blend as a prepreg. Of course, if the polymer and oligomer have identical backbones, compatibility in the blend is more likely to occur.

Prepregs of the oligomers or blends can be prepared by conventional techniques. While woven fabrics are the typical reinforcement, the fibers can be continuous or discontinuous (in chopped or whisker form) and may be ceramic, organic, carbon (graphite), or glass, as suited for the desired application.

Composites can be formed by curing the oligomers or prepregs in conventional vacuum bag techniques. The oligomers can also be used as adhesives, varnishes, films, or coatings.

The most preferred linear polyimides are prepared with dianhydrides selected from para- and meta- dianhydrides of the general formula:

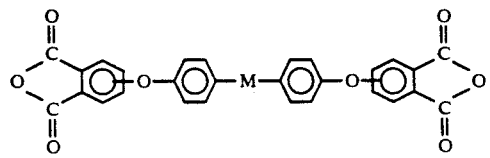

wherein
M=—SO$_2$—, —CO—, —O—, —(CH$_3$)$_2$C—, or —(CF$_3$)$_2$C— reacted with

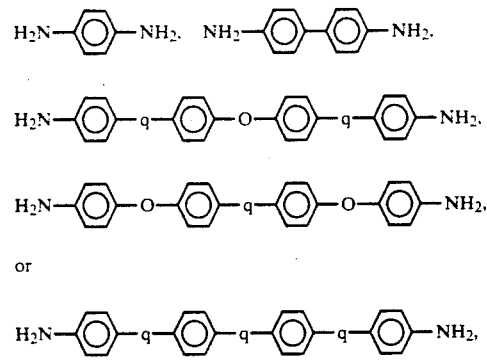

wherein
q=—SO$_2$—, —CO—, —S—, —(CF$_3$)$_2$C—, —O— or —(CH$_3$)$_2$C—

Thermal stabilities in excess of 800° F. are believed to be achievable with these oligomers.

Polyimides having multidimensional morphology can be prepared by condensing the diamines, dianhydrides, and end caps with a suitable amine hub, such as triaminobenzene. For example, triaminobenzene can be reacted with MCTC and any amine end cap to produce a multidimensional, crosslinkable polyimide possessing mono- or difunctional crosslinking capability. The diamines can be used for chain extension of each arm. Short arms of relatively low formula weight are preferred. The multidimensional oligomers have surprisingly high thermal stabilities upon curing.

Suitable hubs include aromatic compounds having at least three amine functionalities. Such hubs include phenyl, naphthyl, biphenyl, azalinyl amines, (including melamine radicals) or triazine derivatives described in U.S. Pat. No. 4,574,154 of the general formula:

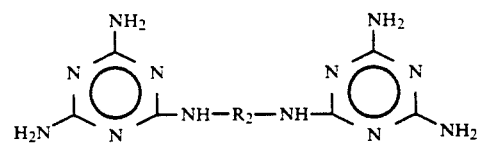

wherein R$_2$ is a divalent hydrocarbon residue containing 1-12 carbon atoms (and, preferably, ethylene).

Additional hubs for these multidimensional polyimides can be prepared by reacting the corresponding hydroxy-substituted hub (such as phloroglucinol) with nitrophthalic anhydride to form trianhydride compounds represented by the formula:

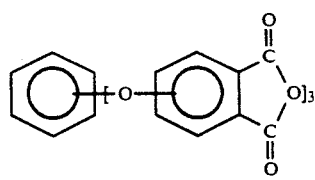

The trianhydride can then be reacted (1) with an amine end cap to form etherimide, multidimensional oligomers or (2) with suitable diamines, dianhydrides, monoanhydride end caps, or amine end caps to form multidimensional polyimides with extended arm lengths.

Yet another class of hubs can be formed by reacting the corresponding halo-hub (such as tribromobenzene)

with aminophenol to form triamine compounds represented by the formula:

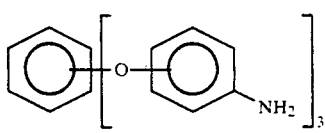

These triamine hubs can be reacted with monoanhydride end caps to form "star" oligomers having three crosslinking sites, or with suitable dianhydrides, mono- or difunctional crosslinking amine end caps, and diamines, if difunctional crosslinking or extended arm lengths are desired. The use of amine end caps allows six crosslinking sites to be incorporated into the ("starburst") oligomers.

The best results are likely to occur when the arm length is as short as possible and the oligomer has six crosslinking sites. The most preferred hub includes the phenyl radical, since these compounds are relatively inexpensive, are more readily obtained, and provide oligomers with high thermal stability.

Even higher thermal stabilities than those previously described for the linear polymides are believed to be achievable with the multidimensional oligomers, particularly with those of the general formula:

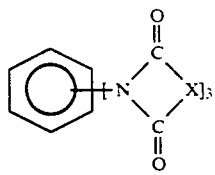

wherein X is as previously defined.

Blends of the multidimensional oligomers are possible, but these compounds are not preferred. Such a blend might include

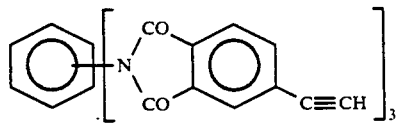

with an equimolar mixture of

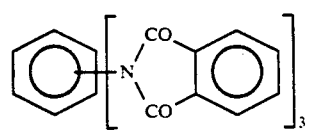

Those skilled in the art will recognize other blends that can be prepared.

Solvent resistant, thermoplastic aromatic poly(imide-sulfone) oligomers are also described in U.S. Pat. Nos. 4,398,021 and 4,489,027.

Melt-fusible polyimides made by the condensation of dianhydrides and diamines are described in U.S. Pat. No. 4,485,140.

The following examples are presented to better illustrate various features of the invention.

EXAMPLE 1

Synthesis of

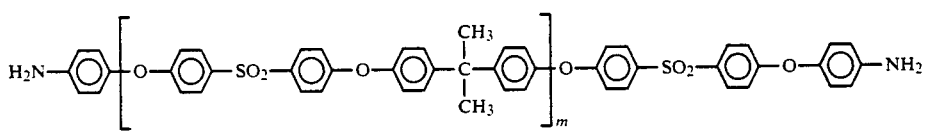

wherein m has an average value greater than 1. (Average Molecular Weight 5000)

In a 1 liter flask fitted with a stirrer, thermometer, Barrett trap, condenser, and N₂ inlet tube, 8.04 g (0.074 moles) p-aminophenol, 86.97 g (0.38 moles) bisphenol A, 281.22 g dimethylsulfoxide (DMSO), and 167.40 g toluene were mixed and stirred. After purging with dry nitrogen, 67.20 g of a 50% solution of sodium hydroxide was added, and the temperature was raised to 110°-120° C. The water was removed from the toluene azeotrope, and then the toluene, until the temperature reached 160° C. The reaction mixture was cooled to 110° C., and 120 g (0.42 moles) 4,4' dichlorodiphenylsulfone as a solid was added. The mixture was reheated to 160° C. and held there for 2 hours. After cooling to room temperature, the mixture was filtered to remove sodium chloride, which precipitated, and the product was coagulated in a blender from a 2% sodium hydroxide solution containing 1% sodium sulfite. The oligomer was recovered from the solution by washing the coagulate with 1% sodium sulfite.

Additional methods for preparing phenoxyphenylsulfones of this general type are disclosed in U.S. Pat. Nos. 3,839,287 and 3,988,374.

EXAMPLE 2

Synthesis of polyimide oligomers using the diamine of Example 1, nadic anhydride, and BTDA. (Average Formula Weight 15,000)

A one liter reaction flask fitted with a stirrer, condenser, thermometer, and a dry N₂ purge was charged with a 60% slurry of 283.64 g (0.057 moles) of the diamine of Example 1 in 189.09 g tetrahydrofuran. In an ice bath, a 10% solution of the mixed anhydrides [6.57 (0.04 moles) nadic anhydride and 11.84 g (0.03 moles) 3,3'-4,4'-benzophenonetetracarboxylic dianhydride (BTDA)] in 165.61 g tetrahydrofuran was gradually added. After stirring for 15 min. in the ice bath, the bath was removed and stirring continued for 2 hr. The oligomer was recovered thereafter.

The formula weight of the oligomer can be adjusted by adjusting the proportions of reactants and the reaction scheme, as will be known to those of ordinary skill in the art.

EXAMPLE 3

Synthesis of

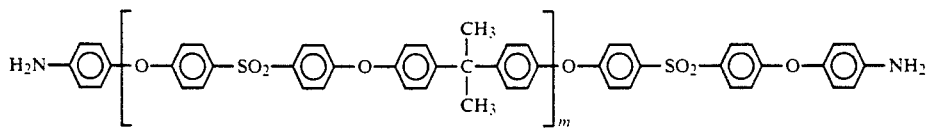

(Average Formula Weight 2,000)

A one liter flask was fitted with a stirrer thermometer, Barrett trap, condenser, and $N_2$ inlet tube and charged with 10.91 g (0.1 moles) of p-aminophenol, 40.43 g (0.18 moles) bisphenol A, 168.6 g DMSO, and 79.23 g toluene. After purging with nitrogen, 36.42 g of a 50% solution of sodium hydroxide was added, and the temperature was raised to 110°-120° C. to remove the water from the toluene azeotrope, and then to distill off the toluene until the temperature reached 160° C. The reaction mixture was cooled to 110° C., and 65.22 g (0.23 moles) 4,4' dichlorodiphenylsulfone as a solid was added. The mixture was heated to 160° C. and held there for 2 hours. After cooling to room temperature, the mixture was filtered to remove sodium chloride. A coagulate was formed in a blender by adding 2% sodium hydroxide solution containing 1% sodium sulfite. The coagulate was removed and washed with 1% sodium sulfite.

EXAMPLE 4

Synthesis of polyimide oligomers using the diamine of Example 3, nadic anhydride, and BTDA. (Average Formula Weight 15,000)

The procedure followed in Example 2 was used, except that a suitable amount of diamine of Example 3 was used instead of the diamine of Example 1.

EXAMPLE 5

Synthesis of polyimide oligomers using the diamine of Example 1, nadic anhydride, and a 50:50 mixture of BTDA and MCTC (Average Formula Weight 20,000)

The procedure followed in Example 2 is used, except that a suitable amount of the BTDA and MCTC mixture was used as the dianhydride.

EXAMPLE 6

Synthesis of a diamine of Example 1 (Average Formula Weight of 10,000).

The procedure followed in Example 1 is used, except that 2.18 g (0.02 moles) of p-aminophenol, 49.36 g (0.216 moles) of bisphenol A, 64.96 g (0.226 moles) of 4,4'-dichlorodiphenyl-sulfone was used.

EXAMPLE 7

Synthesis of polyimide oligomers using the diamine of Example 6, nadic anhydride, and MCTC. (Average Formula Weight 20,440)

The procedure followed in Example 2 was used except that the diamine of Example 6, nadic anhydride, and MCTC were used as the reactants.

EXAMPLE 8

The oligomers obtained in Examples 2, 4, 5 and 7 were impregnated on epoxy-sized T300/graphite fabric style (Union Carbide 35 million modulus fiber 24×24 weave) by first obtaining a 10 to 40% solution of resin in tetrahydrofuran. The solutions were then coated onto the dry graphite fabric to form prepregs with 38 wt. % resin. The prepregs were allowed to dry under ambient conditions to less than 1 percent volatile content, were then cut into 6×6-inch pieces, and were stacked to obtain a consolidated composite of approximately 0.080 inch. The stacks of prepregs were then vacuum bagged and consolidated under 100 psi in an autoclave heated for a sufficient time to induce cure. For nadic anhydride capped systems, such as in Examples 2, 4, 5 and 7, the prepregs were cured for 1-2 hours at 650° F. For dimethyl oxynadic anhydride capped systems, the prepregs were cured for 16 hours at 450° F.

EXAMPLE 9

Graphite fabric prepregs, at 36 percent resin solids, were prepared using the resins of Example 2,4,5 and 7 by solvent impregnation from dilute tetrahydrofuran solution. The graphite fabric was spread on a release film of FEP. The prepregging solution (having approximately 10-40 wt. % oligomer) was swept into the fabric and allowed to dry. The procedure was repeated on alternating sides of the fabric, until the desired weight of resin had been applied. The prepregs were then dried 2 hours at 275° F. in an air-circulating oven.

Seven piles of each prepreg were stacked, double-wrapped in release-coated 2-mil Kapton film, and sealed in a vacuum bag for curing. Each stack was placed in an autoclave at 200 psi and were heated to about 650° F. at a rate of 5°-6° F./min. Upon reaching 650° F., the temperature was held substantially constant for about 1 hr to complete the cure.

EXAMPLE 10

Samples of the cured composites were machined into 1×0.5-inch coupons and placed in bottles containing methylene chloride. The samples were observed to determine if ply seperation would occur. The composites remained intact, with only slight swelling after immersion for up to 2 months.

EXAMPLE 11

Each composite was machined into short beam shear specimens and tested at ambient conditions and 300° F. on a flexure testing fixture using three-point loading with the span being equal to four times the specimen thickness. Results of the testing are reported in Table I.

TABLE I

SUMMARY OF PROPERTIES OBTAINED WITH POLYIMIDE SULFONE OLIGOMERS OF EXAMPLES 2, 4, 5 and 7

| Panel Number | Approximate FMW | Resin Used Example # | Shear Strengths RT | ksi at 300 F. |
|---|---|---|---|---|
| 1 | 15,000 | 2 | 6.5 | 7.0 |
| 2 | 15,000 | 4 | 7.06 | 5.79 |
| 3 | 20,000 | 2 | 6.98 | 4.25 |
|   |        |   | 6.53 | 5.87 |
| 4 | 20,000 | 5 | 7.75 | 4.68 |
| 5 | 20,440 | 7 | 6.87 | 5.21 |
|   |        |   | 7.28 | 5.15 |

While preferred embodiments have been described, those skilled in the art will recognize modifications or variations which might be made without departing from the inventive concept. Therefore, the description and claims should be interpreted liberally with only such limitation as is necessary in view of the pertinent prior art.

We claim:

1. A monofunctional crosslinkable, thermoplastic, polyimide oligomer which is the product formed by reacting under an inert gas atmosphere a mixture comprising:
   (a) two moles of a crosslinkable monoanhydride selected from the group consisting of:

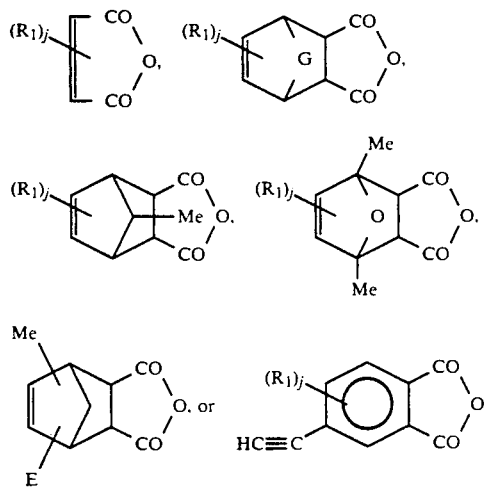

wherein
Me = methyl;
G = —O—, —SO$_2$—, —CH$_2$—, or —S—;
E = allyl or methallyl;
R$_1$ = lower alkoxy, aryl, substituted aryl, lower alkyl, substituted alkyl, aryloxy, or halogen; and
j = 0, 1, or 2

(b) n+1 moles of a polyaryl diamine having terminal amino groups, the diamine including alternating aryl radicals (—Ar—) connected together by alternating ether (—O—) and sulfone (—L—) linkages, wherein each sulfone linkage (—L—) is selected from the group consisting of —SO$_2$—, —S—, —CO—, —(CF$_3$)$_2$C—, and —(CH$_3$)$_2$C—, so that the diamine has a general formula:

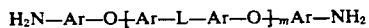

wherein
Ar = an aromatic radial, and
m = a small integer greater than or equal to 1; and (c) n moles of at least one dianhydride selected from the group consisting of,

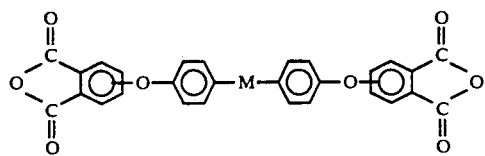

wherein
M = —SO$_2$—, —S—, —O—, —(CH$_3$)$_2$C—, CO or —(CF$_3$)$_2$C—, and wherein n = an integer selected so that the oligomer prossesses thermoplastic properties and has an average formula weight of between about 5,000 to 40,000.

2. The oligomer of claim 1 wherein the aromatic radical (—Ar—) is selected from the group consisting of phenyl or substituted phenyl radicals.

3. The oligomer of claim 2 wherein —L— is —SO$_2$—.

4. The oligomer of claim 3 wherein the oligomer has an average formula weight between about 20,000 to 30,000.

5. The oligomer of claim 1 wherein the diamine is a phenoxyphenyl sulfone diamine of the general formula:

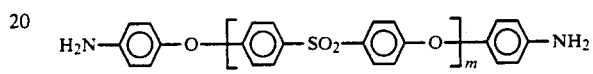

wherein m is a small integer such that the molecular weight of the diamine is between approximately 500 and 10,000.

6. The oligomer of claim 1 wherein the monoanhydride is

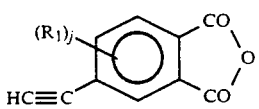

7. The oligomer of claim 1 wherein the diamine is selected from the group of diamines consisting of:

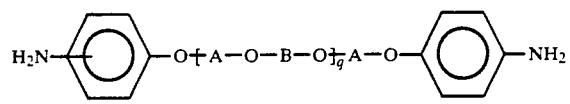

wherein A and B are aromatic radicals, at least one of A and B being a diaryl radical having a sulfone linkage selected from the group consisting of —SO$_2$—, —S—, —CO—, —(CH$_3$)$_2$C—, and —(CF$_3$)C— linking the aryl moieties, and wherein q=0-27.

8. The oligomer of claim 5 wherein the diamine is a phenoxyphenylsulfone diamine selected from the group consisting of:

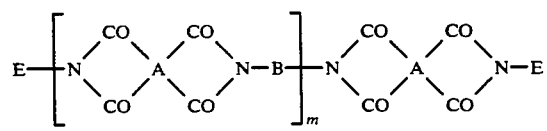

wherein m = an integer such that the diamine has an average formula weight between about 2,000 to 10,000, and wherein the diamine is formed by reacting aminophenol, bisphenol A, and 4,4'-dichlorodiphenylsulfone.

9. A crosslinkable polyimide oligomer having the general formula:

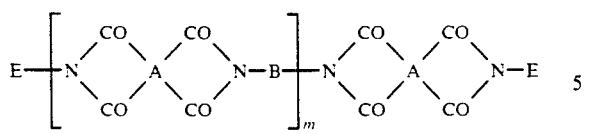

wherein
E is the residue of an amine end cap selected from the group consisting of:

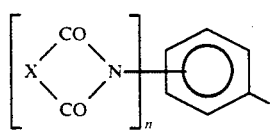

wherein
X is selected from the group consisting of:

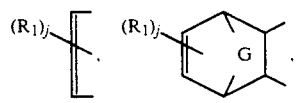

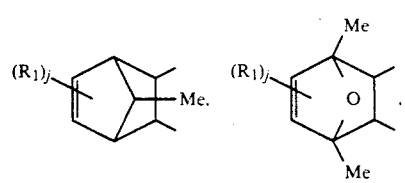

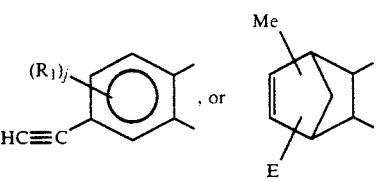

A is the residue of a dianhydride selected from the group consisting of,

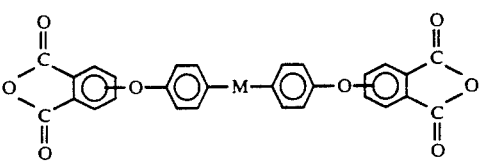

wherein
M=—SO$_2$—, —S—, —O—, —(CH$_3$)$_2$C—, CO or —(CF$_3$)$_2$C—, and
B is the residue of a diamine;
n=1 or 2;
R$_1$=lower alkyl, lower alkoxy, aryl, substituted aryl, substituted alkyl, aryloxy, or halogen;
j=0, 1, or 2;
Me=methyl;
G=—SO$_2$—, —CH$_2$—, —S—, or —O—; and
E=methallyl or allyl.

10. The oligomer of claim 9 wherein the diamine is selected from the group consisting of:

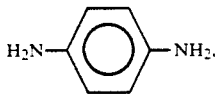

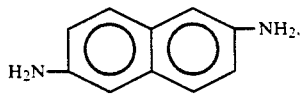

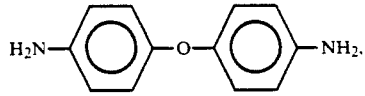

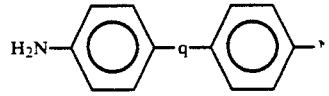

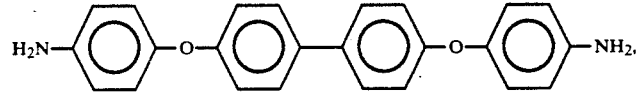

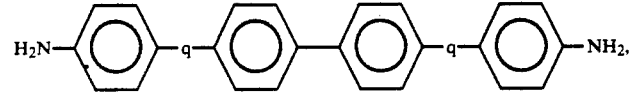

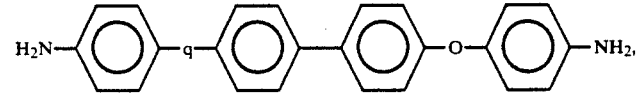

-continued

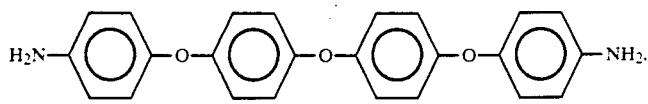

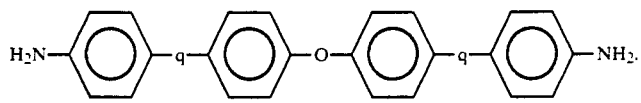

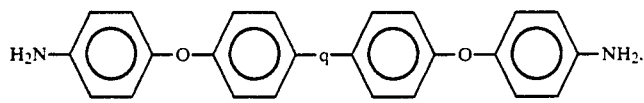

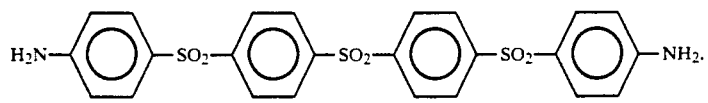

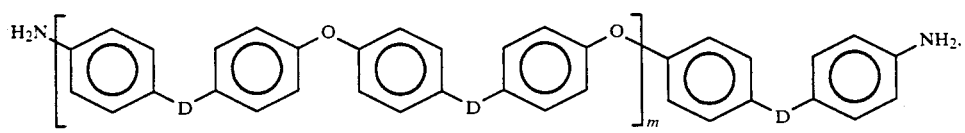

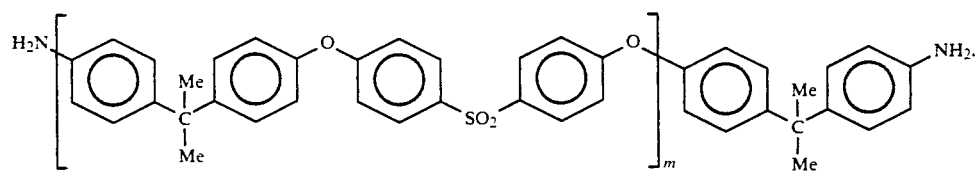

or

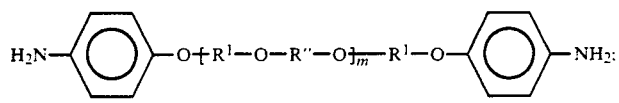

wherein $R^1 =$ 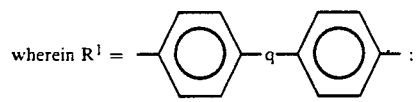:

$R'' =$ 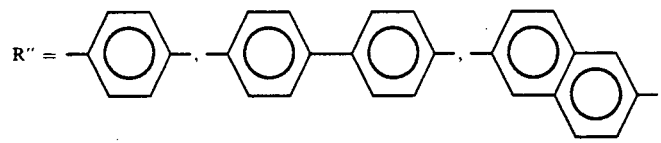,

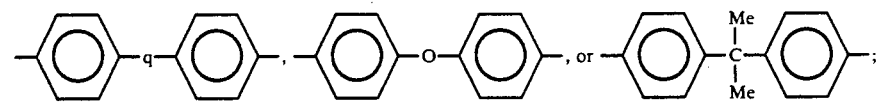;

q = —SO$_2$—, —CO—, —S—, or —(CF$_3$)$_2$C—;
Me = methyl;
m = an integer, generally less than 5; and
D = any of —CO—, —SO$_2$—, or —(CF$_3$)$_2$C—.

11. A prepreg comprising the oligomer of claim 1 and a reinforcing additive in fiber or particulate form.

12. A prepreg comprising the oligomer of claim 9 and a reinforcing additive in fiber or particulate form.

13. The oligomer of claim 9 wherein n = 2.

14. A process for making thermoplastic, solvent-resistant, polyimide oligomers suitable for advanced composites, comprising the step of reacting substantially stoichiometric amounts of a crosslinkable monoanhydride, a diamine, and a dianhydride under an inert atmosphere, wherein the monoanhydride is selected from the group consisting of:

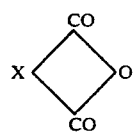

-continued wherein X =

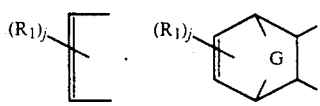

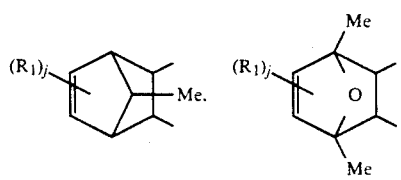

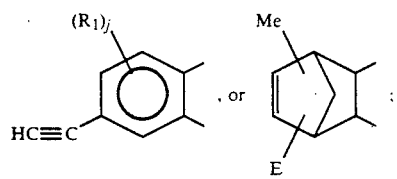

R₁ = lower alkyl, lower alkoxy, aryl, substituted aryl, substituted alkyl, aryloxy, or halogen;
j = 0, 1, or 2;
Me = methyl;
G = —SO₂—, —CH₂—, —S—, or —O—; and
E = methallyl or allyl;
wherein the diamine has:
  terminal amino (—NH₂) groups, a plurality of aromatic radicals, and alternating ether and sulfone linkages connecting the aromatic radicals, wherein each sulfone linkage is selected from the group consisting of: —SO₂—, —S—, —CO—, —(CF₃)₂C—;
wherein the dianhydride selected from the group consisting of,

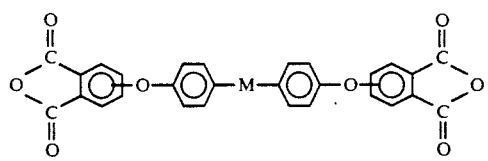

wherein
M = —SO₂—, —S—, —O—, —(CH₃)₂C—, CO or —(CF₃)₂C—, and
wherein the oligomer has an average formula weight in excess of about 5000.

15. The process of claim 14 further comprising the steps of preparing the diamine by reacting aminophenol with a dihydricphenol and a dihalophenylsulfone under an inert atmosphere at an elevated temperature and cooling the diamine.

16. The process of claim 15 wherein the step of preparing the diamine occurs in the presence of a base.

17. A method for making a difunctional, crosslinkable, polyimide oligomer, comprising the step of condensing a difunctional end cap amine of the general formula:

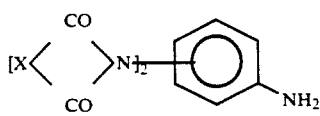

-continued wherein X =

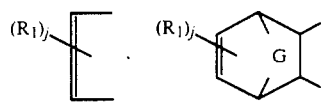

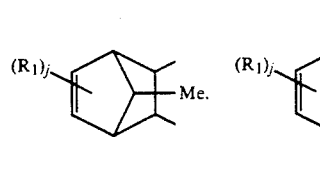

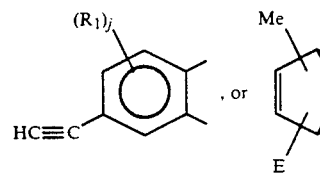

R₁ = lower alkyl, lower alkoxy, aryl, substituted aryl, substituted alkyl, aryloxy, or halogen;
j = 0, 1, or 2;
Me = methyl;
G = —SO₂—, —CH₂—, —S—, or —O—; and
E = methallyl or allyl,
with substantially stoichiometric amounts of a dianhydride selected from the group consisting of,

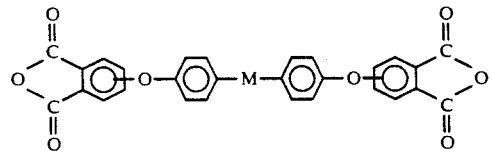

wherein
M = —SO₂—, —S—, —O—, —(CH₃)₂C—, CO or —(CF₃)₂C—, and a diamine under an inert atmosphere.

18. The method of claim 17 wherein the end cap amine and diamine are mixed prior to adding the mixture to the dianhydride.

19. A method of making a multidimensional, crosslinking, polyimide oligomer, comprising the steps of:
(a) condensing an etheramine intermediate of the general formula:

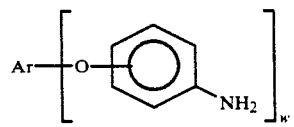

with a dianhydride selected from the group consisting of,

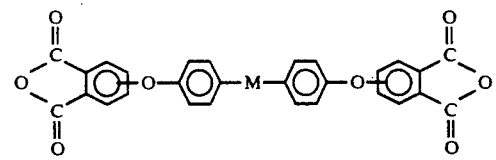

wherein
M=—SO₂—, —S—, —O—, —(CH₃)₂C—, CO or —(CF₃)₂C—, and
to form a multidimensional anhydride; and
(b) adding a diamine and a crosslinkable monoanhydride to the multidimensional anhydride under an inert atmosphere.

20. A method of making a multidimensional, crosslinking, polyimide oligomer comprising the steps of:
(a) condensing an etheranhydride intermediate of the general formula:

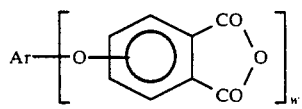

with a diamine to form a multidimensional amine; and
(b) adding a dianhydride selected from the group consisting of,

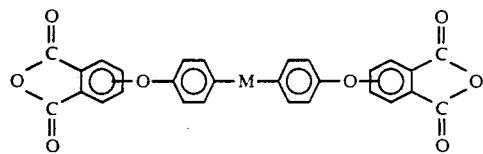

wherein
M=—SO₂—, —S—, —O—, —(CH₃)₂C—, CO or —(CF₃)₂C—, and
crosslinkable amine end cap to the multidimensional amine under an inert atmosphere.

21. The oligomer of claim 9 wherein n is 2 and B is the residue of

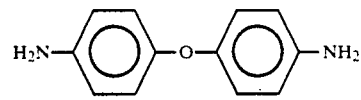

22. The oligomer of claim 10 wherein n is 2.

23. The oligomer of claim 1 wherein the crosslinkable monoanhydride is selected from the group consisting of:

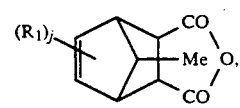

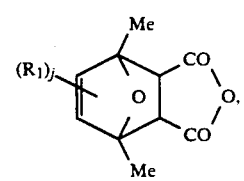

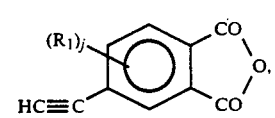

or

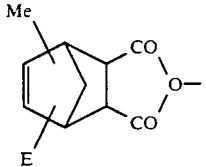

wherein R₁, j, Me and E are as previously defined.

24. The oligomer of claim 1 wherein the crosslinkable monoanhydride is selected from the group consisting of:

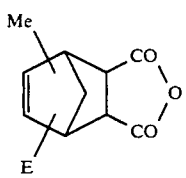

25. The oligomer of claim 24 wherein —L— is —SO₂—.

26. The oligomer of claim 9 wherein X is

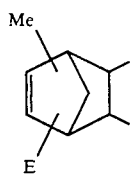

wherein Me and E are as previously defined.

27. The oligomer of claim 26 wherein n=2.

28. The process of claim 14 wherein the monoanhydride is selected from the group consisting of:

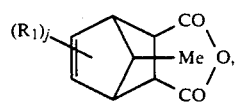

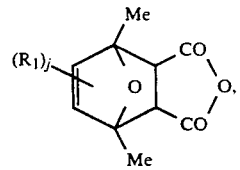

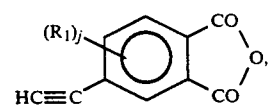

or

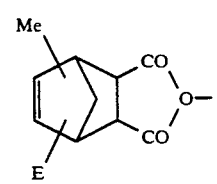

wherein R₁, j, Me and E are as previously defined.

29. The oligomer of claim 14 wherein the crosslinkable monoanhydride is selected from the group consisting of:
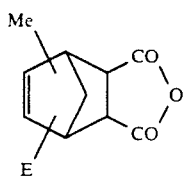

UNITED STATES PATENT AND TRADEMARK OFFICE
CERTIFICATE OF CORRECTION

PATENT NO. : 5,175,234

DATED : December 29, 1992

INVENTOR(S) : Hyman R. Lubowitz and Clyde H. Sheppard

It is certified that error appears in the above-identified patent and that said Letters Patent is hereby corrected as shown below:

In column 6, lines 55-68 and column 7 lines 2-8.

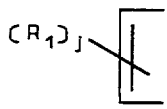 , 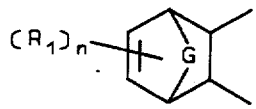 ,

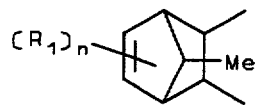 , 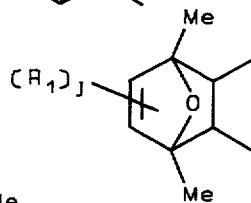 ,

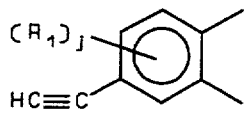 and 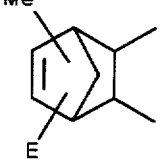 ;

UNITED STATES PATENT AND TRADEMARK OFFICE
CERTIFICATE OF CORRECTION

PATENT NO. : 5,175,234
DATED : December 29, 1992
INVENTOR(S) : Hyman R. Lubowitz and Clyde H. Sheppard It is certified that error appears in the above-identified patent and that said Letters Patent is hereby corrected as shown below:

should read

 , 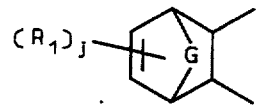 ,

 , 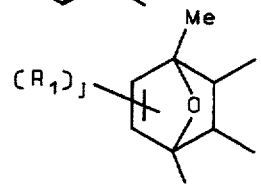 ,

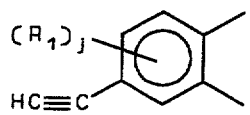 , and 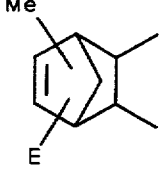 ;

In claim 1, column 23, line 50 "$H_2N-Ar-O{\dashv}_m Ar-L-Ar-O{\dashv}_m Ar-NH_2$" should read -- $H_2N-Ar-O{\dashv}Ar-L-Ar-O{\dashv}_m Ar-NH_2$ --.

UNITED STATES PATENT AND TRADEMARK OFFICE
CERTIFICATE OF CORRECTION

PATENT NO. : 5,175,234

DATED : December 29, 1992

INVENTOR(S) : Hyman R. Lubowitz and Clyde H. Sheppard

Page 3 of 4

It is certified that error appears in the above-identified patent and that said Letters Patent is hereby corrected as shown below:

In claim 10, column 26, starting at line 35,

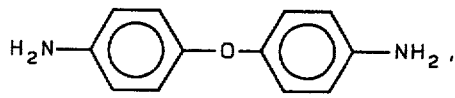

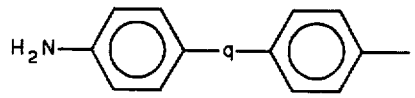

UNITED STATES PATENT AND TRADEMARK OFFICE
CERTIFICATE OF CORRECTION

PATENT NO. : 5,175,234
DATED : December 29, 1992
INVENTOR(S) : Hyman R. Lubowitz and Clyde H. Sheppard Page 4 of 4

It is certified that error appears in the above-identified patent and that said Letters Patent is hereby corrected as shown below:

should read

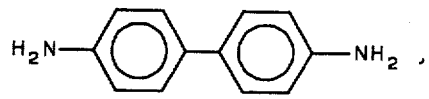

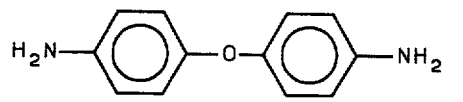

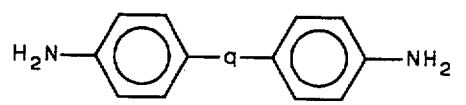

Signed and Sealed this

Seventh Day of March, 1995

Attest:

BRUCE LEHMAN

Attesting Officer        Commissioner of Patents and Trademarks